United States Patent [19]
Sonoda

[11] Patent Number: 5,819,052
[45] Date of Patent: Oct. 6, 1998

[54] PORTABLE COMPUTER WHICH PERFORMS BUS ARBITRATION USING A SERIAL BUS

[75] Inventor: Shingo Sonoda, Hanno, Japan

[73] Assignee: Kabushiki Kaisha Toshiba, Kawasaki, Japan

[21] Appl. No.: 668,120

[22] Filed: Jun. 14, 1996

[30] Foreign Application Priority Data

Jun. 16, 1995 [JP] Japan ................................ 7-150597

[51] Int. Cl.$^6$ .................................................. G06F 13/00
[52] U.S. Cl. ............................. 395/293; 395/287; 395/306
[58] Field of Search .................................... 395/306–309, 395/287, 293, 728–729

[56] References Cited

U.S. PATENT DOCUMENTS

| | | | |
|---|---|---|---|
| 4,577,273 | 3/1986 | Hopper et al. | 395/294 |
| 4,654,655 | 3/1987 | Kowalski | 340/825.5 |
| 4,689,740 | 8/1987 | Moelands et al. | 395/559 |
| 4,827,477 | 5/1989 | Avaneas | 371/37.1 |
| 4,890,224 | 12/1989 | Fremont | 395/831 |
| 4,987,529 | 1/1991 | Craft et al. | 395/293 |
| 5,146,596 | 9/1992 | Whittaker et al. | 395/296 |
| 5,226,173 | 7/1993 | Sasaki et al. | 395/800 |
| 5,289,465 | 2/1994 | Mouro et al. | 370/470 |
| 5,305,442 | 4/1994 | Pedersen et al. | 395/290 |
| 5,341,480 | 8/1994 | Wasserman et al. | 395/287 |
| 5,414,814 | 5/1995 | McKim | 395/821 |
| 5,426,740 | 6/1995 | Bennett | 395/306 |
| 5,479,395 | 12/1995 | Goodman et al. | 370/438 |
| 5,555,383 | 9/1996 | Elazar et al. | 395/306 |
| 5,596,724 | 1/1997 | Mullins et al | 395/250 |

FOREIGN PATENT DOCUMENTS 4-84255   3/1992   Japan .

OTHER PUBLICATIONS

Philips Semiconductors, "The I$^2$C-bus and how to use it", Jan. 1992, pp. 1–23.

*Primary Examiner*—Jack B. Harvey
*Assistant Examiner*—Sumati Lefkowitz
*Attorney, Agent, or Firm*—Cushman Darby & Cushman IP Group of Pillsbury Madison & Sutro LLP

[57] ABSTRACT

An I/o control gate array, a power supply controller, an EEPROM of a battery pack, a DS (docking station) controller, and an EEPROM of a docking station are connected to an I$^2$C serial BUS. This I$^2$C serial BUS and an ISA bus are connected by the I/O control gate array. The I/O control gate array incorporates a master control logic. Master arbitration between the power supply controller and the DS controller connected to the I$^2$C BUS is intensively controlled by arbitration circuitry of the I/O control gate array by using REQ# and GNT# lines of these masters.

13 Claims, 8 Drawing Sheets

FIG. 4A CLOCK 32kHz
FIG. 4B PSREQ #
FIG. 4C DPREQ #
FIG. 4D PSGNT #
FIG. 4E DPGNT #

PORTABLE COMPUTER WHICH PERFORMS BUS ARBITRATION USING A SERIAL BUS

BACKGROUND OF THE INVENTION

1. Field of the Invention

The present invention relates to a portable computer system powered by a battery and, more particularly, to a portable computer system which performs communications between a plurality of I/O devices by using a bi-directional bus constituted by one clock signal line and one serial data line.

2. Description of the Related Art

Conventionally, the mainstream of system buses used in personal computers have been an ISA (Industry Standard Architecture) bus and an EISA (Extended ISA) bus. Recently, however, a PCI (Peripheral Computer Interconnect) bus is beginning to be used in order to increase the data transfer rate and construct system architectures independent of processors.

In this PCI bus, most data transfer is basically done by block transfer, and this block transfer is effectuated by using burst transfer. Consequently, it is possible to realize a data transfer rate of a maximum of 133 Mbytes/sec (when a 32-bit data bus is used) by using a PCI bus. Accordingly, the use of a PCI bus makes it possible to increase the rates of data transfer between I/O devices and between a system memory and I/O devices and therefore improve the system performance.

This PCI bus architecture is beginning to be used in battery-powered portable computers.

In portable computers, however, the total width of buses arranged on the system board must be minimized due to limitations on the packaging area of the system board. For this reason, serial communication between devices is used except for devices between which a large amount of information must be transferred at a high rate. The use of a bus capable of serial transfer is desired since this also makes it possible to minimize the width of buses connecting devices and decrease the number of pins of LSIs for realizing these devices.

SUMMARY OF THE INVENTION

It is the first object of the present invention to provide a computer system capable of using a serial data bus which can minimize the width of buses connecting devices and decrease the number of pins of LSIs for realizing these devices.

It is the second object of the present invention to provide a portable computer capable of efficiently performing communications between devices, which are required to operate as bus masters, by using a bi-directional bus with a simple structure constituted by one clock signal line and one serial data line, without providing each device with a bus monitoring or surveillance function.

According to an aspect of the present invention, there is provided a portable computer comprising: a bi-directional bus consisting of one clock line and one data line; at least one controller connected to the bi-directional bus to generate a request for the use of the bi-directional bus when communication processing occurs; a control line pair provided for each of the at least one controller and consisting of a request signal line and a grant signal line; and a bus controller for receiving the generated use request through the request signal line and, in accordance with a predetermined priority order, transmitting a permission for the use of the bi-directional bus to a controller to be granted permission of the at least one controller through the grant signal line.

In this portable computer, various devices such as a power supply controller are connected to the bi-directional bus with a simple structure consisting of one clock signal line and one serial data line. This bi-directional bus is connected to a system bus by the bus (I/O) controller. Master arbitration between bus masters connected to the bi-directional bus is intensively controlled by the bus controller by using the bus masters' bus access request signal lines and bus access grant signal lines. Accordingly, the master arbitration between the devices can be accurately performed without providing each device with a bus monitoring function.

According to a second aspect of the present invention, there is provided a computer system having a portable computer by a battery and an extended unit in which the portable computer can be loaded, comprising: a bi-directional bus consisting of one clock line and one data line; an extended unit controller provided in the extended unit and connected to the bi-directional bus to generate a request for the use of the bi-directional bus when communication processing occurs and execute the communication processing in accordance with a use permission; and a bus controller provided in the portable computer for arbitrating, when the use request is generated, the permission for the use of the bi-directional bus in accordance with a predetermined priority order, and detecting an abnormality of the communication processing and arbitrating the use of the bi-directional bus.

In this system, the power supply controller, an extended unit controller, and the bus controller are connected to the bi-directional bus. The arbitration portion provided in the bus controller performs master arbitration by using a pair of bus arbitration control lines which each of the power supply controller and the extended unit controller has. Therefore, even if an extended unit is removed from a main body of the portable computer when the extended unit controller is a current master, the bi-directional bus can be released from the extended unit controller since a bus access request signal from the extended controller unit becomes inactive. Consequently, it is possible to prevent the inconvenient limitation in which the internal devices of the computer main body cannot become a master permanently.

According to a third aspect of the present invention, there is provided a computer system comprising: a first bi-directional bus consisting of one clock line and one data line; at least one controller connected to the bi-directional bus to generate a request for the use of the bi-directional bus when communication processing occurs and execute the communication processing in accordance with a use permission; a second bi-directional bus consisting of one clock line and one data line; at least one device connected to the second bi-directional bus to store predetermined information; and a bus controller for receiving the generated use request, transmitting the permission for the use of the bi-directional bus to a controller to be granted permission of the at least one controller in accordance with a predetermined priority order, executing slave processing in accordance with a controller which executes the communication processing, and performing master processing with one of the at least one device through the second bi-directional bus.

In this system, the bus controller which connects with different bi-directional buses (the first and second bi-directional buses) can operate as a master and can operate as a slave at the same time when one of the controller serves as a master. Therefore, the bus controller of the system can perform communications at the same time using the different bi-directional buses.

According to a fourth aspect of the present invention, there is provided a computer system comprising: a CPU (Central Processing Unit) for controlling the computer system; a system bus to which the CPU is connected; a bi-directional bus consisting of one clock line and one data line; at least one controller connected to the bi-directional bus to generate a request for the use of the bi-directional bus when communication processing occurs; and a bus controller provided between the bi-directional bus and the system bus to receive the generated use request and transmit a permission for the use of the bi-directional bus to a controller to be granted permission of the at least one controller in accordance with a predetermined priority order, and having a plurality of registers for storing data generated by the communication processing performed by the at least one controller, wherein the CPU reads out the data stored in the registers through the system bus.

In this system, the bus controller which controls a right to use the bi-directional bus has a plurality of registers for storing information regarding communication processing. Therefore, an element such as a CPU connecting with the system bus can easily read out the information regarding the communication processing using the bi-directional bus.

According to a fifth aspect of the present invention, there is provided a computer system comprising: a CPU (Central Processing Unit) for controlling the computer system; a system bus to which the CPU is connected; a bi-directional bus consisting of one clock line and one data line; at least one controller connected to the bi-directional bus to generate a request for the use of the bi-directional bus when communication processing occurs; and a bus controller provided between the bi-directional bus and the system bus to receive the generated use request and having a register for storing information indicating the request for the use of the bi-directional bus in accordance with a request from the CPU, the bus controller granting permission for the use of the bi-directional bus to either the at least one controller or the bus controller itself in accordance with a predetermined priority order and performing communication processing, under the control of the CPU, in accordance with the permission for the use of the bi-directional bus.

In this system, to be able to operate as a bus master, the bus controller includes a register in which bus access request information is written. The bus access request information in the register is supplied as one bus access grant signal line to the bus controller. The master arbitration is performed for the bus controller in the same manner as for other devices by using the register, instead of the bus access request signal line. Consequently, an appropriate bus arbitration is possible regardless of which device is to operate as a master.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENTS

A preferred embodiment of the present invention will be described below with reference to the accompanying drawings.

Figure 1:
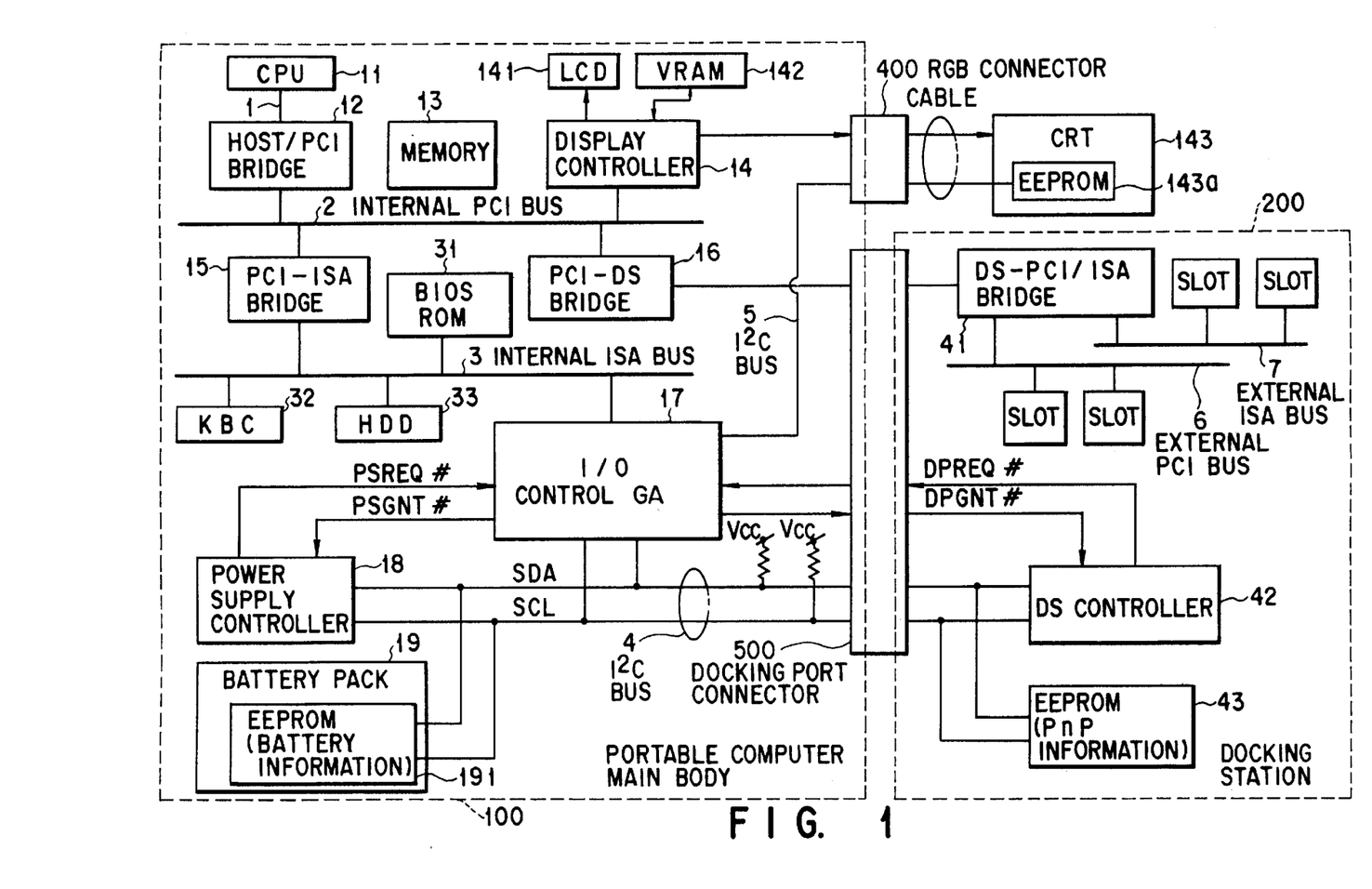
FIG. 1 is a block diagram showing the configuration of a computer system according to one embodiment of the present invention.

FIG. 1 shows the construction of a computer system according to one embodiment of the present invention. This computer system has a notebook-type or laptop-type portable computer main body 100 powered by a battery and a docking station 200 connectable to this portable computer main body 100. A CRT (Cathode Ray Tube) display 143 can also be connected, where necessary, to the portable computer main body 100. On a system board of the portable computer main body 100, a processor bus 1, an internal PCI bus 2, an internal ISA bus 3, and first and second bi-directional buses 4 and 5 are arranged. An external PCI bus 6 and an external ISA bus 7 are arranged in the docking station 200 connectable to a docking port connector 500 of the portable computer main body 100. In this embodiment, a computer system which uses $I^2C$ BUSes manufactured by Phillips Corp. as the bi-directional buses 4 and 5 will be described. This $I^2C$ BUS is a bi-directional bus constituted by one data line (SDA) and one clock signal line (SCL).

The computer main body 100 comprises a CPU (Central Processing Unit) 11, a host/PCI bridge 12, a system memory 13, a display controller 14, an internal PCI-ISA bridge 15, a PCI-DS (DS: Docking Station) bridge 16, an I/O control gate array 17, a power supply controller 18, a battery pack 19, a BIOS ROM (BIOS: Basic Input Output System, ROM: Read-Only Memory) 31, a keyboard controller (KBC) 32, and a HDD (Hard Disk Drive) 33. The docking station 200 comprises ISA extended slots, PCI extended slots, a DS-PCI/ISA bridge 41, a DS controller 42, and an EEPROM (Electrically Erasable and Programmable ROM) 43.

An example of the CPU 11 is a microprocessor "Pentium" manufactured and sold by Intel Corp. The processor bus 1 directly connected to I/O pins of this CPU 11 has a 64-bit data bus.

The system memory 13 is a memory device for storing an operating system, device drivers, application programs to be executed, and processing data, and is constituted by a plurality of DRAMs (Dynamic Random Access Memories). This system memory 13 is connected to the host/PCI bridge 12 through a dedicated memory bus having a 32- or 64-bit data bus. The data bus of the processor bus 1 also can be used as a data bus of this memory bus. If this is the case, the memory bus is constituted by an address bus and various memory control signal lines.

The host/PCI bridge 12 is a bridge LSI (Large Scale Integration) for connecting the processor bus 1 and the internal PCI bus 2 and functions as one of the bus masters of the PCI bus 2. This host/PCI bridge 12 has, e.g., a function of converting bi-directional bus cycles including data and addresses between the processor bus 1 and the internal PCI bus 2 and a function of controlling access to the system memory 13 through the memory bus.

The internal PCI bus 2 is a clock-synchronized I/O bus, and all cycles on the internal PCI bus 2 are performed in synchronism with PCI bus clocks. The maximum frequency of the PCI bus clocks is 33 MHz. The PCI bus 2 has an address/data bus which is used time-divisionally. This address/data bus is a 32-bit bus.

The data transfer cycle on the PCI bus 2 consists of an address phase and one or more data phases connected to the address phase. In the address phase, an address and a transfer type are output. In the data phase, 8-, 16-, 24-, or 32-bit data is output.

Like the host/PCI bridge 12, the display controller 14 is one of bus masters of the PCI bus 2. The display controller 14 displays image data from a video memory (VRAM) 142 on an LCD 141 or the external CRT display 143.

The internal PCI-ISA bridge 15 is a bridge LSI for connecting the internal PCI bus 2 and the internal ISA bus 3. The internal ISA bus 3 is connected to the BIOS ROM 31, the keyboard controller 32, the HDD 33, and the I/O control gate array 17.

The PCI-DS bridge 16 is a bridge LSI for connecting the internal PCI bus 2 and a docking bus equivalent to a PCI bus and extended to the docking station 200 through the docking port connector 500. The PCI-DS bridge 16 functions as a bus master on the PCI bus 2.

The I/O control gate array 17 is a bridge LSI for connecting the internal ISA bus 3 and the first I²C BUS 4 and incorporates a plurality of registers capable of being read and written by the CPU 11. These registers enable communications between the CPU 11 and the devices on the I²C BUS 4.

The I²C BUS 4 is a bi-directional bus consisting of one clock signal line (SCL) and one data line (SDA) and is extended to the docking station 200 through the docking port connector 500. The clock signal line (SCL) and the data line (SDA) are pulled up to level "H".

In this system, the I²C BUS 4 is used in communications between the five devices, i.e., the I/O control gate array 17, the power supply controller 18, an EEPROM 191 of the battery pack 19, the DS controller 42, and the EEPROM 43.

The I/O control gate array 17 incorporates a master arbitration unit for arbitrating the right to use the I²C BUS 4 between the power supply controller 18 and the DS controller 42 which operate as masters among other devices connected to the I²C BUS 4. This master arbitration is done by using a pair of arbitration control signal lines (a bus access request signal line PSREQ# and a bus access grant signal line PSGNT#) of the power supply controller 18, a pair of arbitration control signal lines (a bus access request signal line DPREQ# and a bus access grant signal line DPGNT#) of the DS controller 42, and the registers.

The I/O control gate array 17 is also connected to the I²C BUS 5 extended to the external CRT display 143 through an RGB connector 400. It is possible, through the I²C BUS 5, to read out monitor IDs from an internal EEPROM 143a of the external CRT display 143 and information for power control of the CRT display 143.

The battery pack 19 is detachably mounted in the computer main body 100 and incorporates the EEPROM 191 which is connected to the I²C BUS 4. This EEPROM 191 stores battery information which indicates the type of secondary battery and the remaining capacity of the battery pack 19. This battery information is read out by the power supply controller 18 and used to control charging of the battery and manage the system power supply.

The power supply controller 18 controls the operating power supply, e.g., turns on and off the system power supply. More specifically, the power supply controller 18 controls charging of the secondary battery of the battery pack 19. This power supply controller 18 can function as a bus master of the I²C BUS 4 and, by using the I²C BUS 4, reads out the battery information from the EEPROM 191, communicates with the DS controller 42 to realize hot docking/hot undocking, and also communicates with the I/O control gate array 17 to exchange various power supply statuses/power supply control commands with the CPU 11. The power supply statuses include information such as the ON/OFF of a system power switch, the battery remaining capacity, and the presence/absence of an AC adapter.

When the power supply controller 18 wants to use the I²C BUS 4, the power supply controller 18 first makes the bus access request signal line PSREQ# active and waits until the bus access grant signal line PSGNT# becomes active. When the bus access grant signal line PSGNT# becomes active, the power supply controller 18 starts bus cycles (a start cycle, a transfer cycle, and a stop cycle) of the I²C BUS 4. When all data transfer is completed, the power supply controller 18 makes the bus access request signal line PSREQ# inactive and releases the I²C BUS 4.

The docking station 200 is an extended unit detachably attached to the portable computer main body 100. The housing of this docking station 200 has a docking surface on which the portable computer main body 100 is placed and an auto-loading mechanism for docking the docking station 100 with the portable computer main body 100 under the control of the DS controller 42 when the computer main body 100 is set on the docking surface. The docking station 200 also includes a detection switch, an eject switch, and a power switch. The detection switch is used to detect that the portable computer main body 100 is set and inform the DS controller 42 of this detection. The eject switch is an operation switch for detaching the computer main body 100 docked with the docking station 200 by the auto-loading mechanism from the docking station 200. When the eject switch is depressed, a motor of the auto-loading mechanism is reversely rotated to electrically separate the portable computer main body 100 from the docking station 200, making the computer main body 100 removable from the docking station 200.

The DS-PCI/ISA bridge 41 of the docking station 200 is a bridge LSI for connecting a docking bus (equivalent to a PCI bus) extended from the computer main body 100 to the docking station 200 with the external PCI bus 6 and the external ISA bus 7. The DS-PCI/ISA bridge 41 is one of the PCI bus masters.

The DS controller 42 controls ON/OFF of the power supply of the docking station 200 and docking/undocking of the portable computer main body 100 and the docking station 200. The DS controller 42 communicates with the power supply controller 18 and the I/O control gate array 17 through the I$^2$C BUS 4. This DS controller 42 also can operate as a bus master of the I$^2$C BUS 4.

When the DS controller 42 wants to use the I$^2$C BUS 4, the DS controller 42 first makes the bus access request signal line DPREQ# active and waits until the bus access grant signal line DPGNT# becomes active. When the bus access grant signal line DPGNT# becomes active, the DS controller 42 starts bus cycles (a start cycle, a transfer cycle, and a stop cycle) of the I$^2$C BUS 4. When all data transfer is completed, the DS controller 42 makes the bus access request signal line DPREQ# inactive and releases the I$^2$C BUS 4.

The EEPROM 43 stores PnP information necessary for plug-and-play, such as the attributes (e.g., the address, DMA channel, and IRQ number) of an extended card installed into the extended slot of the docking station 200. When the computer main body 100 is docked with the docking station 200 or when the computer main body 100 or the docking station 200 is powered on, the PnP information is read out from the EEPROM 43 by the control gate array 17 through the I$^2$C BUS 4 under the control of the system BIOS of the BIOS ROM 31.

A detailed construction of the I/O control gate array 17 will be described below with reference to FIG. 2.

Figure 2:
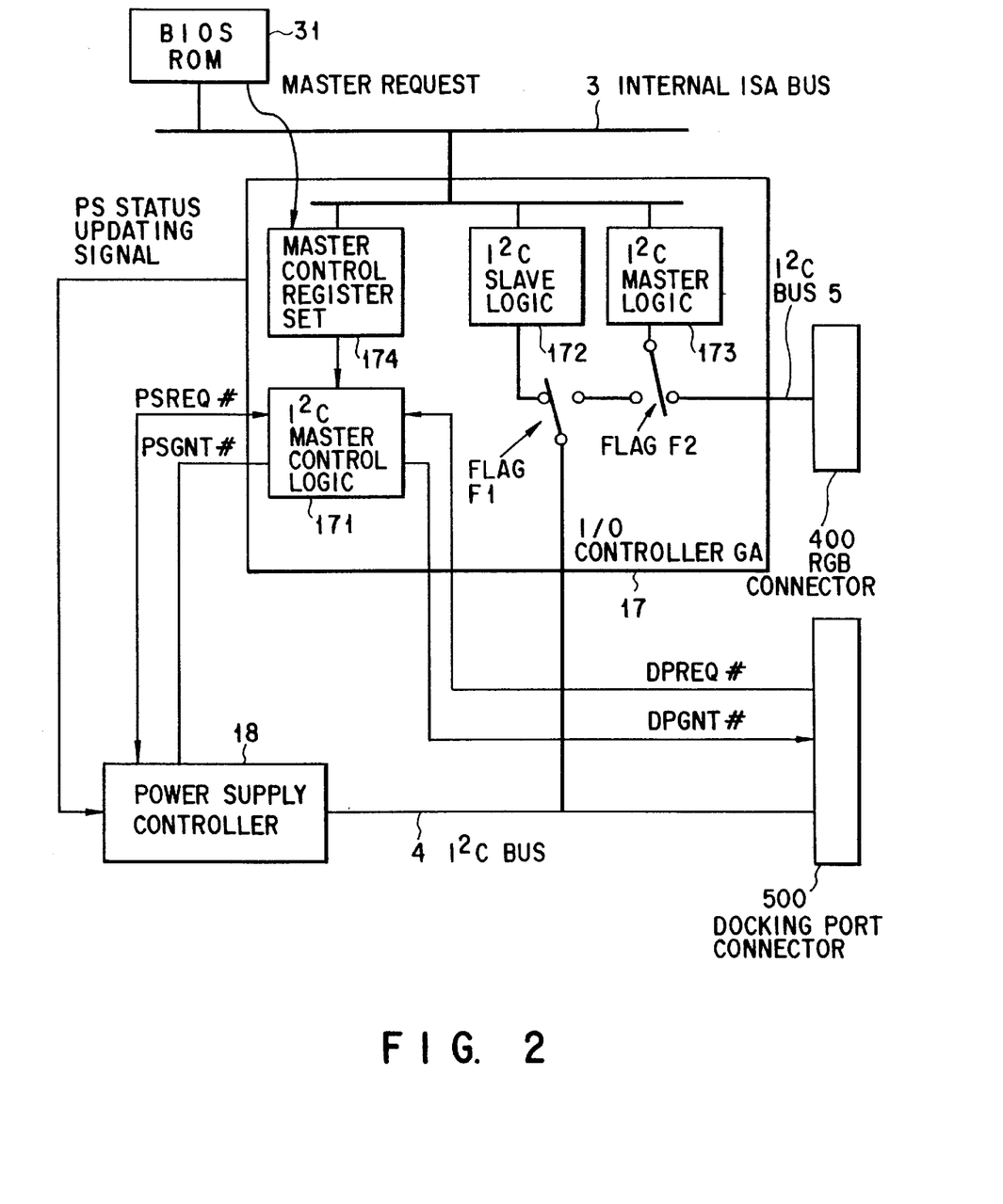
FIG. 2 is a block diagram showing the configuration of an I/O control gate array and its peripheral portion shown in FIG. 1.

As shown in FIG. 2, the I/O control gate array 17 is provided with an I2C master control logic 171, an I2C slave logic 172, an I2C master logic 173, and a master control register set 174.

The I2C master control logic 171 is a master arbitration device which determines the bus master of the I$^2$C BUS 4 by using the bus arbitration control signal lines (PSREQ#, PSGNT#, DPREQ#, and DPGNT#). The master control register set 174 can be read and written by the CPU 11 and includes an I2C master arbitration control register. A flag for requiring the I/O control gate array 17 to operate as a master of the I$^2$C BUS 4 is set in this I2C master arbitration control register by the CPU 11. This flag is sent to the I2C master control logic 171 as one bus access request signal (REQ#). Consequently, the I/O control gate array 17, as well as the power supply controller 18, can be added to the master arbitration processing for the I$^2$C BUS 4.

The I2C slave logic 172 is hardware which operates as a slave device of the I$^2$C BUS 4. The I2C slave logic 172 includes a communication register used to communicate with the devices connected to the I$^2$C BUS 4.

The I2C master logic 173 is hardware which operates as a master device of the I $^2$C BUS 4 and the I$^2$C BUS 5. The I2C master logic 173 includes a communication register and a bus cycle control logic.

Figure 5:
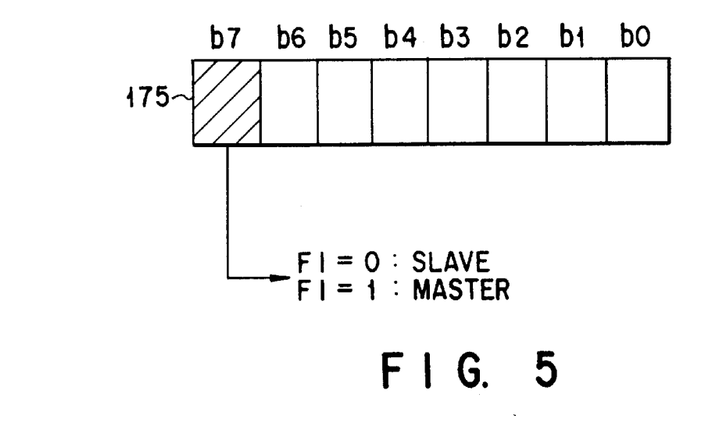
FIG. 5 is a view for explaining an $I^2C$ BUS interface control register provided in the I/O control gate array shown in FIG. 2.

The operations of these I2C slave logic 172 and I2C master logic 173 are controlled by a flag F1 set in an I$^2$C BUS interface control register provided in the I/O control gate array 17. That is, as illustrated in FIG. 5, an I$^2$C BUS interface control register 175 is an 8-bit register which can be read and written by the CPU 11, and the flag F1 is set in a bit b7 of the register. The flag F1 is used to set the operation mode of the I/O control gate array 17 with respect to the I$^2$C BUS 4 to a bus master mode or a slave mode. F1 ="0" indicates the slave mode and F1="1"indicates the master mode.

When F1="0", only the I2C slave logic 172 is permitted to use the I$^2$C BUS 4, and the I2C master logic 173 is inhibited to use the I$^2$C BUS 4. Accordingly, as illustrated in FIG. 2, only the I2C slave logic 172 is connected to the I$^2$C BUS 4, and the I2C master logic 173 is disconnected from the I$^2$C BUS 4.

Figure 6:
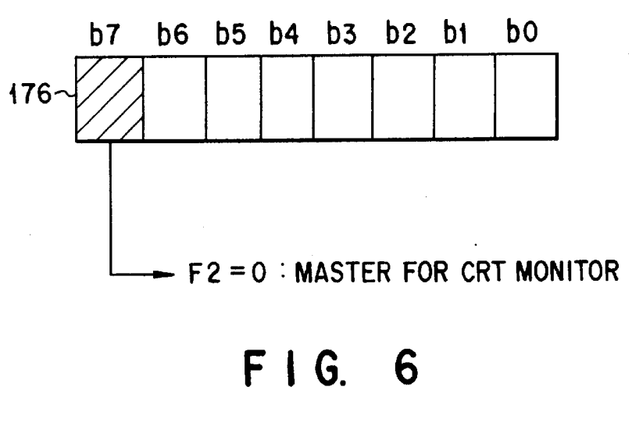
FIG. 6 is a view for explaining a monitor ID control register provided in the I/O control gate array shown in FIG. 2.

The operation of the I2C master logic 173 is also controlled by a flag F2 set in a monitor ID control register provided in the I/O control gate array 17. That is, as shown in FIG. 6, a monitor ID control register 176 is an 8-bit register capable of being read and written by the CPU 11, and the flag F2 is set in a bit b7 of the register. The flag F2 is used to specify whether the I/O control gate array 17 is to operate as the bus master of the I$^2$C BUS 5. F2="0" designates the execution of communication using the I$^2$C BUS 5 with the CRT 143.

When F1="0" and F2="0", therefore, while the I$^2$C slave logic 172 is operating as a slave of the I$^2$C BUS 4, the I2C master logic 173 can operate as a master of the I$^2$C BUS 5.

Also, as illustrated in FIG. 2, a PS status update signal line is extended from the I/O control gate array 17 to the power supply controller 18. This PS status update signal is made active when the system BIOS sends information to the power supply controller 18. When the PS status update signal is made active, the power supply controller 18 acquires the right to use the I$^2$C BUS 4 and performs bus cycles to read out data from the communication register of the I/O control gate array 17.

Figure 3:
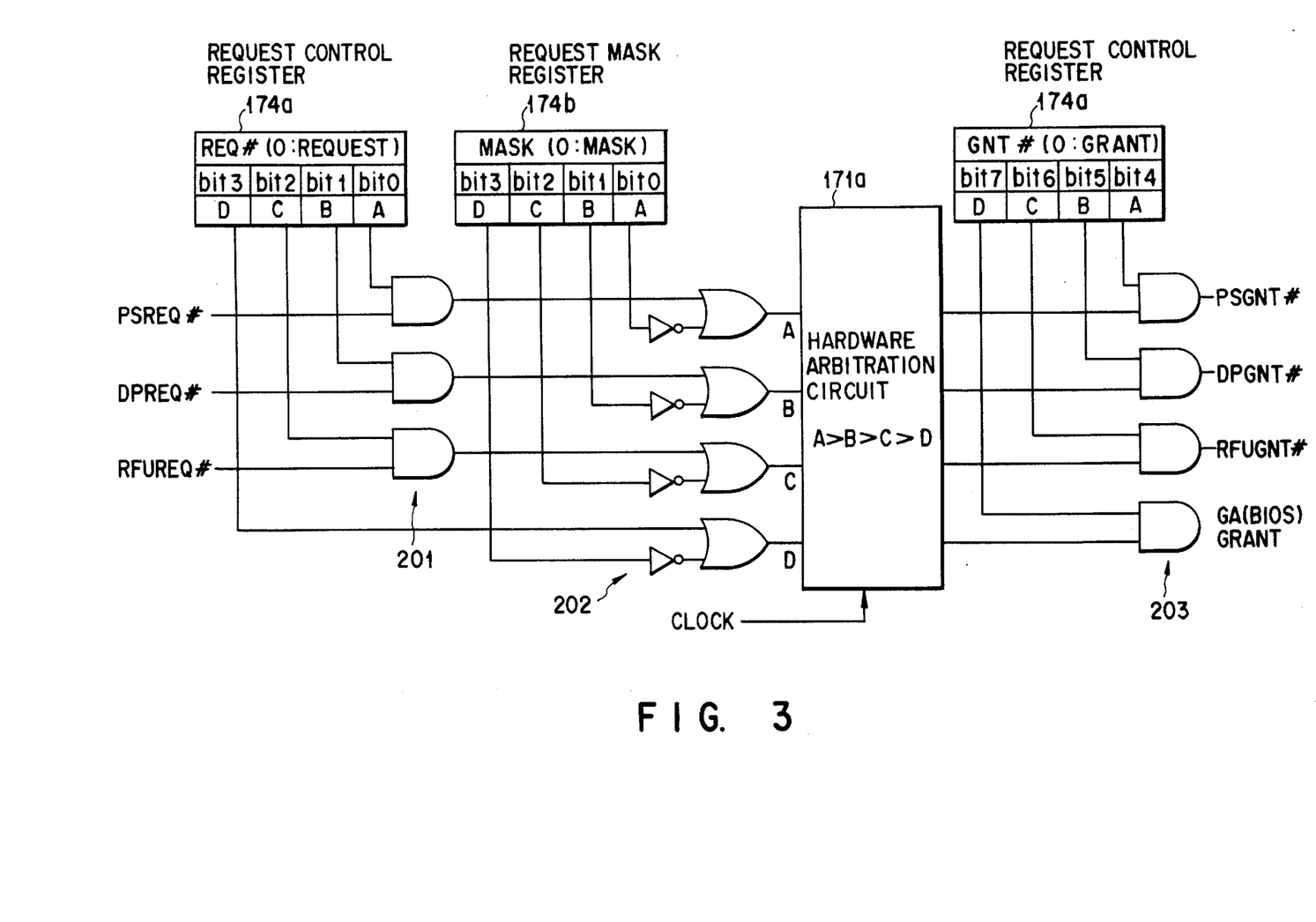
FIG. 3 is a block diagram showing an I2C master control logic of the I/O control gate array shown in FIG. 2.
Figure 4A:
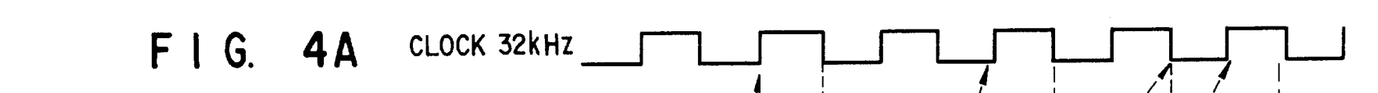
FIGS. 4A to 4E are timing charts showing a bus arbitrating operation performed by the master control logic shown in FIG. 3.
Figure 4B:
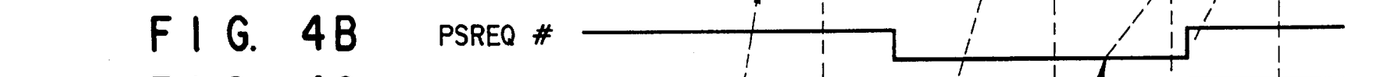
Figure 4C:
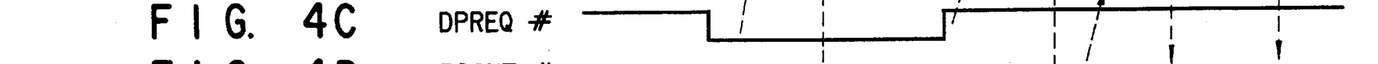
Figure 4D:
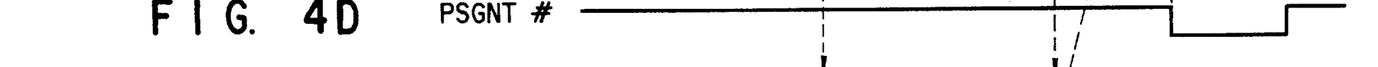
Figure 4E:
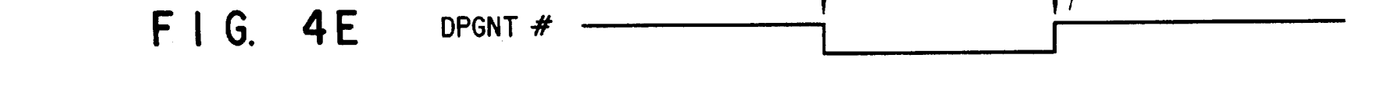

FIG. 3 shows a detailed hardware configuration of the I2C master control logic 171 in FIG. 2.

The I2C master control logic 171 has a hardware arbitration circuit 171a having request inputs A, B, C, and D for receiving four REQ#'s. The priority order of bus arbitration of this hardware arbitration circuit 171a is the request inputs A, B, C, and D.

Two gate circuits 201 and 202 are provided before the request inputs of the hardware arbitration circuit 171a. Through these gate circuits 201 and 202, PSREQ# is supplied to the request input A and DPREQ# is supplied to the request input B. RFREQ# supplied to the request input C is a reservation bus access request signal.

The request input D receives the value of bit 3 of an I2C master arbitration request control register 174a via the gate circuit 202. Bit 3 is a flag for requesting the I/O control gate array 17 to operate as a master of the I$^2$C BUS 4. When bit 3 is set by the CPU 11, the bus access request signal at the request input D is enabled.

The values of bits 2, 1, and 0 of the I2C master arbitration request control register 174a are ANDed by negative logic with RFREQ#, DPREQ#, and PSREQ#, respectively, by the gate circuit 201. Accordingly, it is possible to forcedly generate RFREQ#, DPREQ#, and PSREQ# by software.

The values of bits 3, 2, 1, and 0 of an I2C master arbitration request master register 174b are supplied to the gate circuit 202 where mask processing is performed for bit 3 of the I2C master arbitration request control register 174a, RFREQ#, DPREQ#, and PSREQ#. Consequently, even if a failure in which the power supply controller 18 or the DS controller 42 does not release the I²C BUS 4 takes place, it is possible to prevent the inconvenient situation in which the I²C BUS 4 cannot be used permanently.

A gate circuit 203 is provided after four grant outputs of the I2C master control logic 174a. The gate circuit 203 performs and processing by negative logic for bits 7, 6, 5, and 4 of the I2C master arbitration request control register 174a. A grant output corresponding to the request input D is a bus access grant signal for the I/O control gate array 17. The value of the signal is transmitted to the internal register of the I/O control gate array 17 and read by the CPU 11.

FIGS. 4A to 4E show the timings of the bus arbitrating operation by the I2C master control logic 171a.

As shown in the timing charts of FIGS. 4A to 4E, the status of each bus access request signal (bit 3 of the register 174a, RFREQ#, DPREQ#, or PSREQ#) is checked at the leading edge of each clock. At the trailing edge of the clock, which request permission is to be granted is determined.

Figure 7:
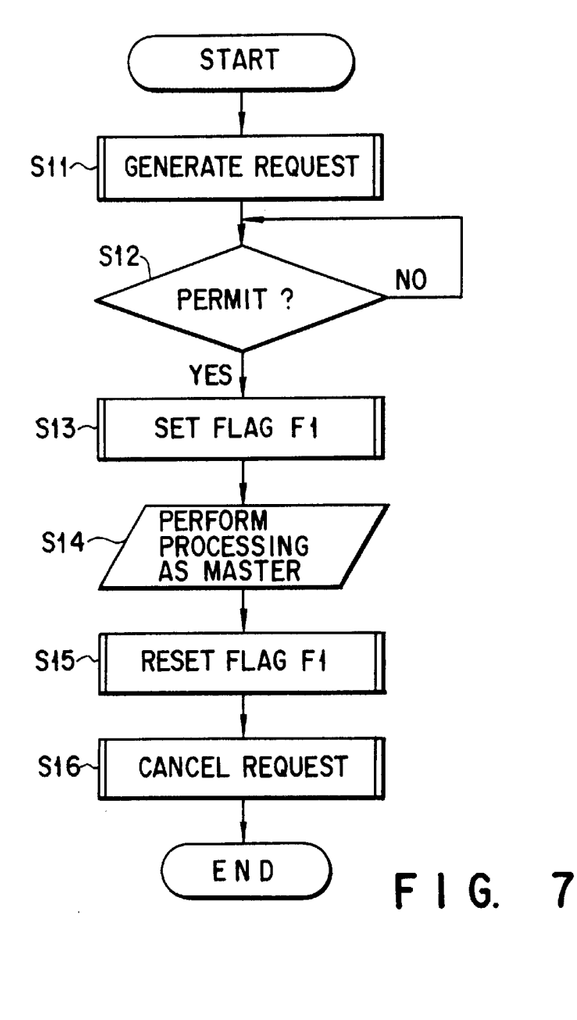
FIG. 7 is a flow chart for explaining the procedure by which the I/O control gate array in FIG. 2 acquires the right to use a first $I^2C$ BUS.

The processing of acquiring the right to use the I²C BUS 4 will be described below with reference to the flow chart in FIG. 7. FIG. 7 shows the processing by which the I/O control gate array 17 (system BIOS) acquires the right to use the I²C BUS 4.

The system BIOS executed by the CPU 11 first writes "0" in bit 3 of the I2C master arbitration request control register 174a to generate a bus access request signal (step S11) and waits until permission is granted (step S12). Whether permission is granted is checked by, e.g., polling a register in which the grant status is set. That is, the system BIOS checks whether the bit b7 of the I2C master arbitration request control register 174a is "0", and waits until the bit b7 becomes "0". Waiting until permission is granted (until the bit b7 becomes "0") means that hardware bus arbitration is being performed by the I/O control GA 17.

When permission is granted, the system BIOS sets the flag F1 to "1" and sets the operation mode of the I/O control gate array 17 to the master mode (step S13). The system BIOS then executes the read bus cycle of the I²C BUS 4 to read, e.g., PnP information (step S14).

Subsequently, the system BIOS sets the flag F1 to "0" and returns the operation mode of the I/O control gate array 17 to the slave mode (step S15). Thereafter, the system BIOS writes "1" in bit 3 of the I2C master arbitration request control register 174a and releases the I²C BUS 4.

By the above processing, the system BIOS, i.e., the I/O control GA 17 itself can become a bus master and execute the processing using the I²C BUS 4.

When the power supply controller 18 is to acquire the right to use the I²C BUS 4, the power supply controller 18 makes PSREQ# active when a request is generated in step S11 of FIG. 7. In step S12, the power supply controller 18 checks whether PSGNT# is active. If PSGNT# is active, the power supply controller 18 determines that permission is granted. To cancel the request, i.e., to relinquish the right to use the I²C BUS 4 in step S16, the power supply controller 18 makes PSREQ# inactive. Note that when the power supply controller 18 is to acquire the right to use the I²C BUS 4, the processes in steps S13 and S15 of FIG. 7 are not performed.

When the DS controller 42 wants to acquire the right to use the I²C BUS 4, the DS controller 42 makes DSREQ# active when a request is generated in step S11 of FIG. 7. In step S12, the DS controller 42 checks whether DSGNT# is active. If DSGNT# is active, the DS controller 42 determines that permission is granted. To cancel the request, i.e., to relinquish the right to use the I²C BUS 4 in step S16, the DS controller 42 makes DSREQ# inactive. Note that when the DS controller 42 wants to acquire the right to use the I²C BUS 4, as in the case of the power supply controller 18, the processes in steps S13 and S15 of FIG. 7 are not performed.

Figure 8:
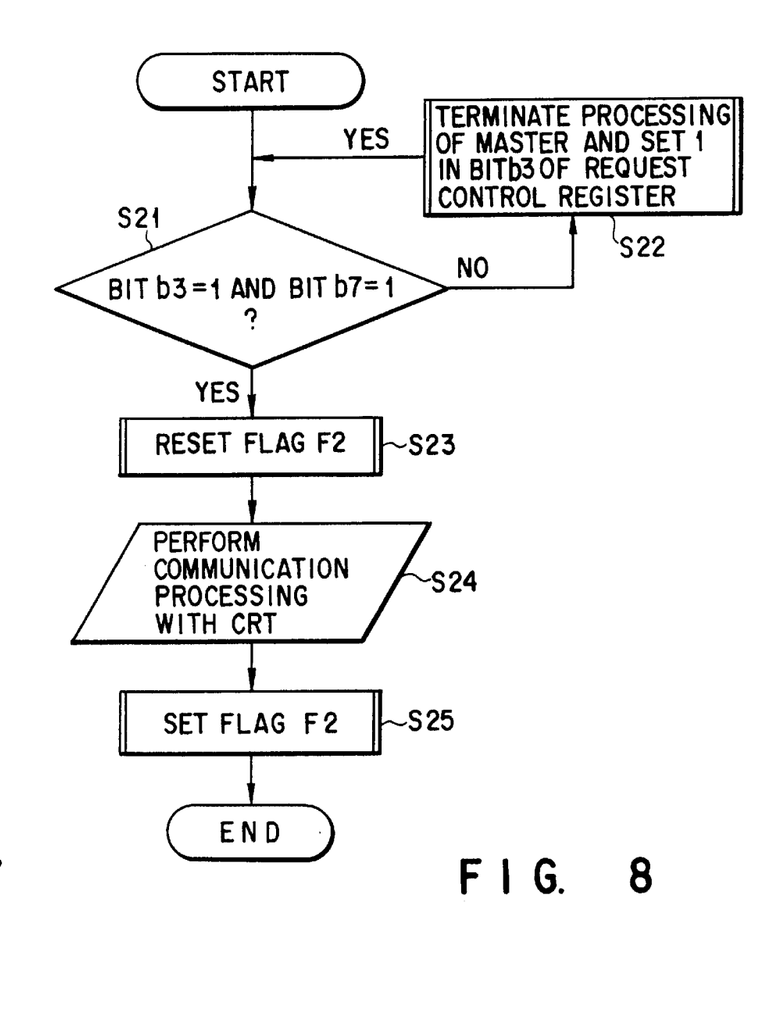
FIG. 8 is a flow chart for explaining the procedure by which the I/O control gate array in FIG. 2 acquires the right to use a second $I^2C$ BUS.

The procedure by which the I/O control gate array 17 (system BIOS) performs communications by using the I²C BUS 5 will be described below with reference to the flow chart in FIG. 8.

The system BIOS executed by the CPU 11 first checks whether bit 3 or 7 of the I2C master arbitration request control register 174a is "1" (step S21). If bit 3 or 7 is not "1", the system BIOS writes "1" in bit 3 of the I2C master arbitration request control register 174a in order to terminate the operation as a master (step S22).

If both of bits 3 and 7 are "1" (YES in step S21), the system BIOS sets the flag F2 to "0" to allow the I2C master logic 173 to operate as a master of the I²C BUS 5 (step S24). That is, the system BIOS allows the I2C master logic 173 to communicate with the EEPROM 143a of the CRT 143 (step S24). When the communication is completed, the system BIOS sets the flag F2 to "1" and completes the mode in which the I/O control gate array 17 operates as a master of the I²C BUS 5 (step S25).

By the above processing, the I/O control gate array 17, i.e., the system BIOS can communicate with the CRT 143 by using the I²C BUS 5. During this processing the I/O control gate array 17 can function as both a bus master of the I²C BUS 5 and a slave of the I²C BUS 4. That is, when the flags F1 and F2 are set to "0" the I2C master logic 173 and the I2C slave logic 172 can operate at the same time. Accordingly, it is possible to simultaneously use the two different I²C BUSes 4 and 5 connected to the I/O control gate array 17.

Transmission and reception of data when the I/O control gate array (system BIOS) 17 functions as a bus master or a slave will be described below with reference to the accompanying drawings.

Figure 9:
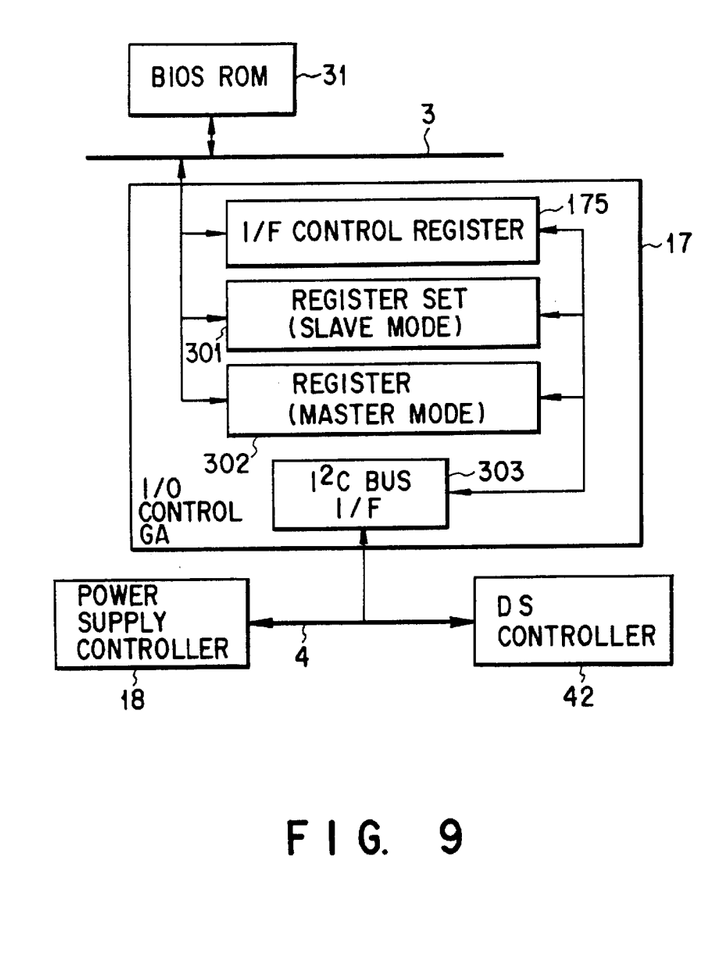
FIG. 9 is a block diagram showing the configuration by which the I/O control gate array operates as a master or a slave.

FIG. 9 is a block diagram showing the configuration by which the I/O control gate array 17 transmits and receives data. The I/O control gate array 17 has the I/F control register 175, a register set 301 used in the slave mode, a register 302 used in the master mode, and an I²C BUS I/F 303 which interfaces with the I²C BUS 4.

As described previously, the I/F control register 175 is an 8-bit register having bits 0 to 7 illustrated in FIG. 5. The bit b7 indicates the master/slave select state of the I/O control gate array 17. Three bits from the bit b0 to the bit b2 of this I/F control register 175 are used to set the state (execute cycle) of the I/O control gate array 17. That is, by setting predetermined bits in these three bits, an automatically designated state, i.e., a transmission state or a reception state occurs. More specifically, a transmission cycle or a receive cycle is executed.

The register set 301 is used to transmit and receive data when the I/O control gate array 17 is a slave. This register set 301 consists of registers corresponding to various information. The registers of the I/O control gate array 17 includes such as a first command register for communication with the power supply controller, a second command register for communication with the DS controller 42, and a control register for storing connecting control data with the docking station 200.

The register 302 is an 8-bit register having bits 0 to 7 used to transmit addresses and transmit and receive data when the I/O control gate array 17 is a master. In transmission, data to be transmitted is previously stored in the register 302. In reception, transmitted serial data is sequentially stored from bit 7.

The I²C BUS I/F 303 interfaces with the I²C BUS 4. That is, the I²C BUS I/F 303 converts serial data sent from the I²C BUS 4 into parallel data or vice versa.

The units including the I/O control gate array 17 which can function as a bus master, i.e., the I/O control gate array 17, the power supply controller 18, and the DS controller 42 can execute their respective cycles (generate various states) after acquiring the right to use the I²C BUS 4. These cycles include a start cycle, a stop cycle, a restart cycle, a transmission cycle, a receive cycle (including ACK (acknowledge) transmission), and a receive cycle (not including ACK transmission). In any of these cycles, processing is properly performed for an abnormal state occurring during the communication. In the start cycle, a bus master which has acquired the right to use the I²C BUS 4 informs the start of communication. In this processing, a communication clock and the like are set. In the stop cycle, the bus master completes the communication and releases the bus. In the restart cycle, the bus master informs that some communication processing is subsequently started without releasing the bus. In the transmission cycle, the bus master transmits data to a slave. In the receive cycle (including ACK transmission), the bus master receives 8-bit data from a slave. When receiving the data normally, the bus master transmits a 1-bit ACK to the slave after the reception of the 8-bit data. In the receive cycle (not including ACK transmission), a target is informed by non-transmission of an of ACK that the target does not require the preparation of the next data to be transmitted.

Figure 10:
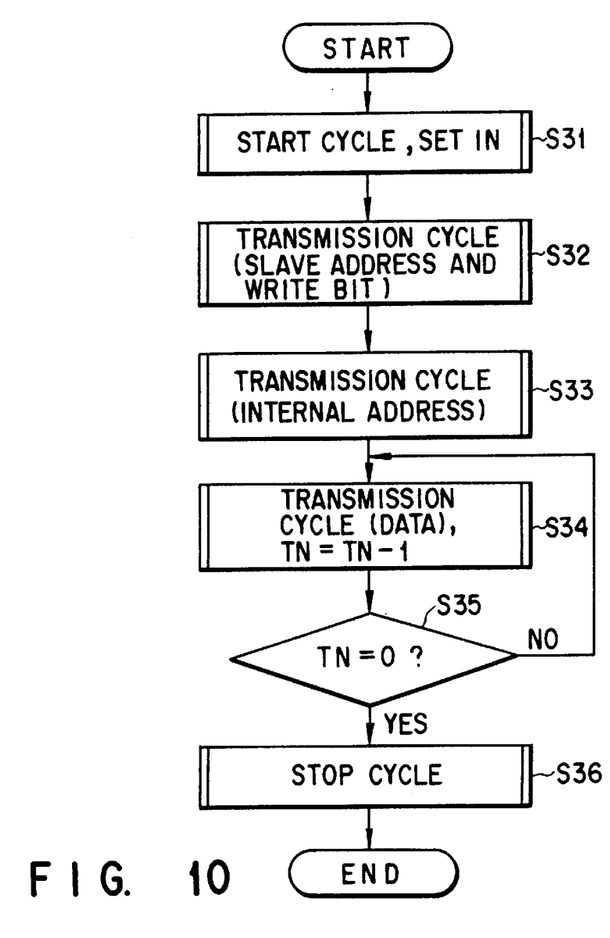
FIG. 10 is a flow chart for explaining the operation by which the I/O control gate array transmits data as a master.

An operation when the I/O control gate array 17 (system BIOS) is a master and transmits data to a slave will be described below with reference to FIG. 10.

After acquiring the right to use the I²C BUS 4, the system BIOS executes the start cycle indicating the start of communication and sets the number (TN) of data to be transmitted (step S31). As described above, the start cycle is executed by setting predetermined values in the three bits, from the bit b0 to the bit b2, of the I/F control register 175. Each data is 8-bit data. The system BIOS informs the I/O control gate array 17 of the number (TN) of data to be transmitted.

Thereafter, the system BIOS executes the transmission cycle for transmitting, to the register 302, an address assigned to a unit to be used as a slave and a write bit indicating data write access (step S32). For example, when the I/O control gate array 17 is to transmit data to the EEPROM 191, 7 bits of an address assigned to the EEPROM 191 and 1-bit data indicating write access are stored in the register 302. The system BIOS then sets a predetermined value in the I/F control register 175 to transmit the data stored in the register 302. Accordingly, the data stored in the register 302 is transmitted bit by bit to the I²C BUS 4. This allows the EEPROM 191 to recognize that the output data to the I²C BUS 4 is data to be transmitted to itself.

The system BIOS further executes the transmission cycle for transmitting an internal address (step S33). In this cycle, an internal address is stored in the register 302 to again transmit the data stored in the register 302. Accordingly, it is possible to designate, from a plurality of registers provided in the slave, a register to which the data is to be transmitted. If the internal address has 8 bits or more, the transmission cycle is repeatedly executed a necessary number of times.

After the above processing, the system BIOS executes the transmission cycle for transmitting data (step S34). The system BIOS stores data to be transmitted in the register 302 and sets a predetermined value in the I/F control register 175. Also, the system BIOS transmits 8-bit data and simultaneously decrements the number (TN) of data to be transmitted. This data transmission cycle is executed until TN=0 (steps S34 and S35).

When the data transmission is completed, the system BIOS executes the stop cycle and terminates the communication (step S36). As described previously, the stop cycle is executed by setting a predetermined value in the I/F control register 175.

By the above processing, a data transfer is performed by the I/O control gate array 17 (system BIOS) which has acquired the bus use right.

Figure 11:
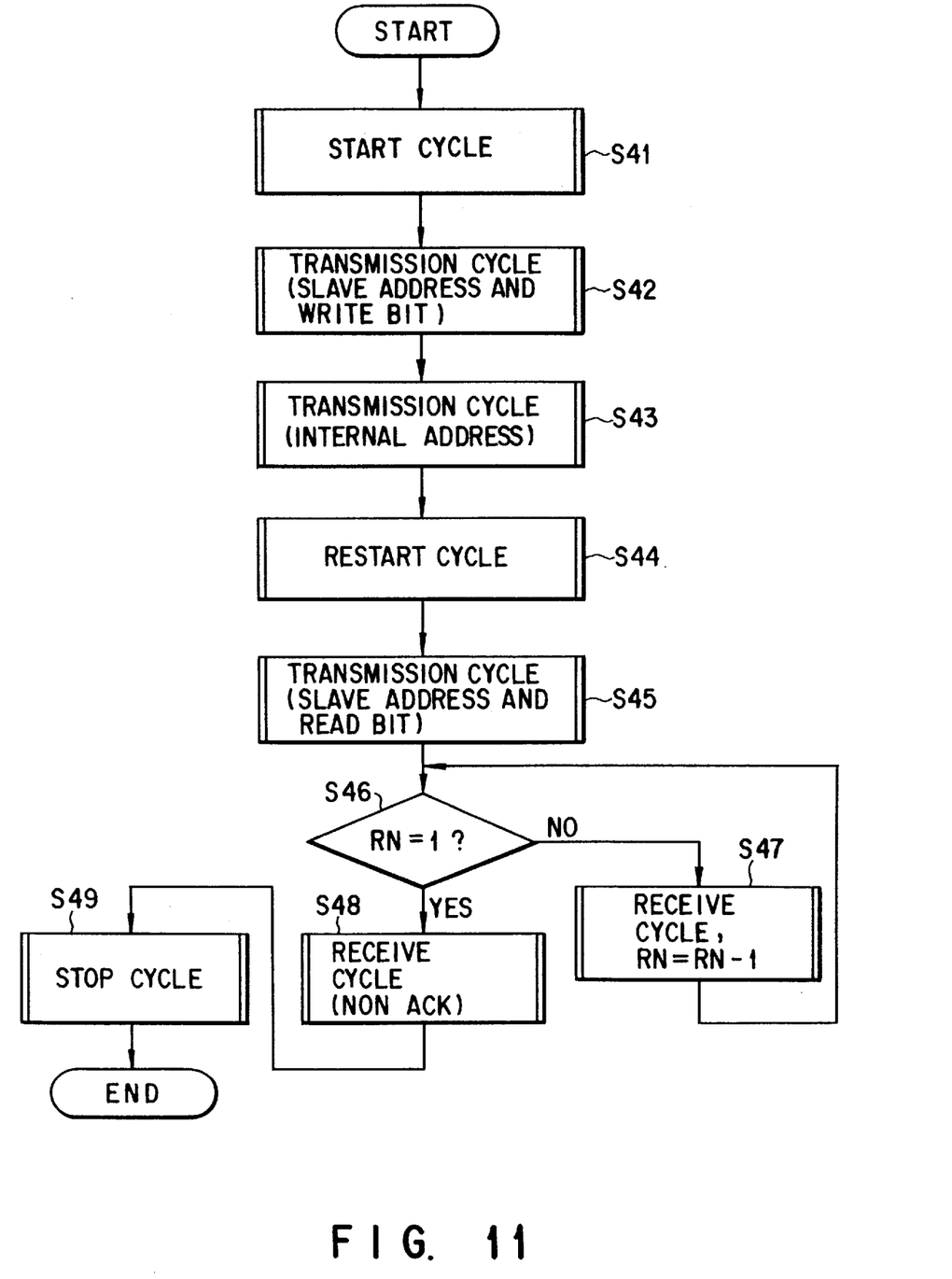
FIG. 11 is a flow chart for explaining the operation by which the I/O control gate array receives data as a master.

An operation when the I/O control gate array 17 (system BIOS) is a master and receives data from a slave will be described below with reference to FIG. 11. Note that each cycle is done by using the I/F control register 175 and the register 302 as in the data transmission operation described above.

First, the system BIOS executes the start cycle to inform the start of communication (step S41). Thereafter, the system BIOS must perform processing of designating a slave and also designating a register in the slave from which data is to be read out. For this purpose, the system BIOS executes the transmission cycle for transmitting a slave address and a write bit (step S42). The system BIOS also executes the internal address transmission cycle for designating a register in the slave designated in step S42 (step S43). If this internal address has 8 bits or more, the transmission cycle is repeated a necessary number of times. Similar to the operation of transmitting data to a slave described above, these transmission cycles are done by storing the address and the data to be transmitted in the register 302 and setting a value indicating the transmission cycle of the data in the I/F control register 175.

After step S43, the system BIOS executes the restart cycle and further executes the transmission cycle for transmitting the slave address and the read bit (steps S44 and S45). Consequently, the slave recognizes the transmitted read bit and sequentially sends the data while incrementing the internal address until the master does not send back any further ACK.

After executing the transmission cycle, the system BIOS checks whether the number (RN) of the received data is 1(step S46). If RN ≠1(NO in step S46), the system BIOS executes the receive cycle including ACK transmission and decrements RN (step S47). In this receive cycle, the output data from the slave is sequentially stored in the register 302. When the 8-bit data is normally stored, the I/O control gate array 17 outputs a 1-bit ACK. Thereafter, the system BIOS reads out the data stored in the register 302.

If RN=1(YES in step S46), the system BIOS executes the receive cycle not including the transmission of ACK (step S48). In this cycle, the I/O control gate array 17 does not output an ACK even after the 8-bit data is normally stored in the register 302. Accordingly, the slave stops outputting the data.

When completed with reading out the data stored in the register 302, the system BIOS executes the stop cycle for terminating the communication (step S49).

By the above processing, the system BIOS completes the processing of reading out data from the slave.

Figure 12:
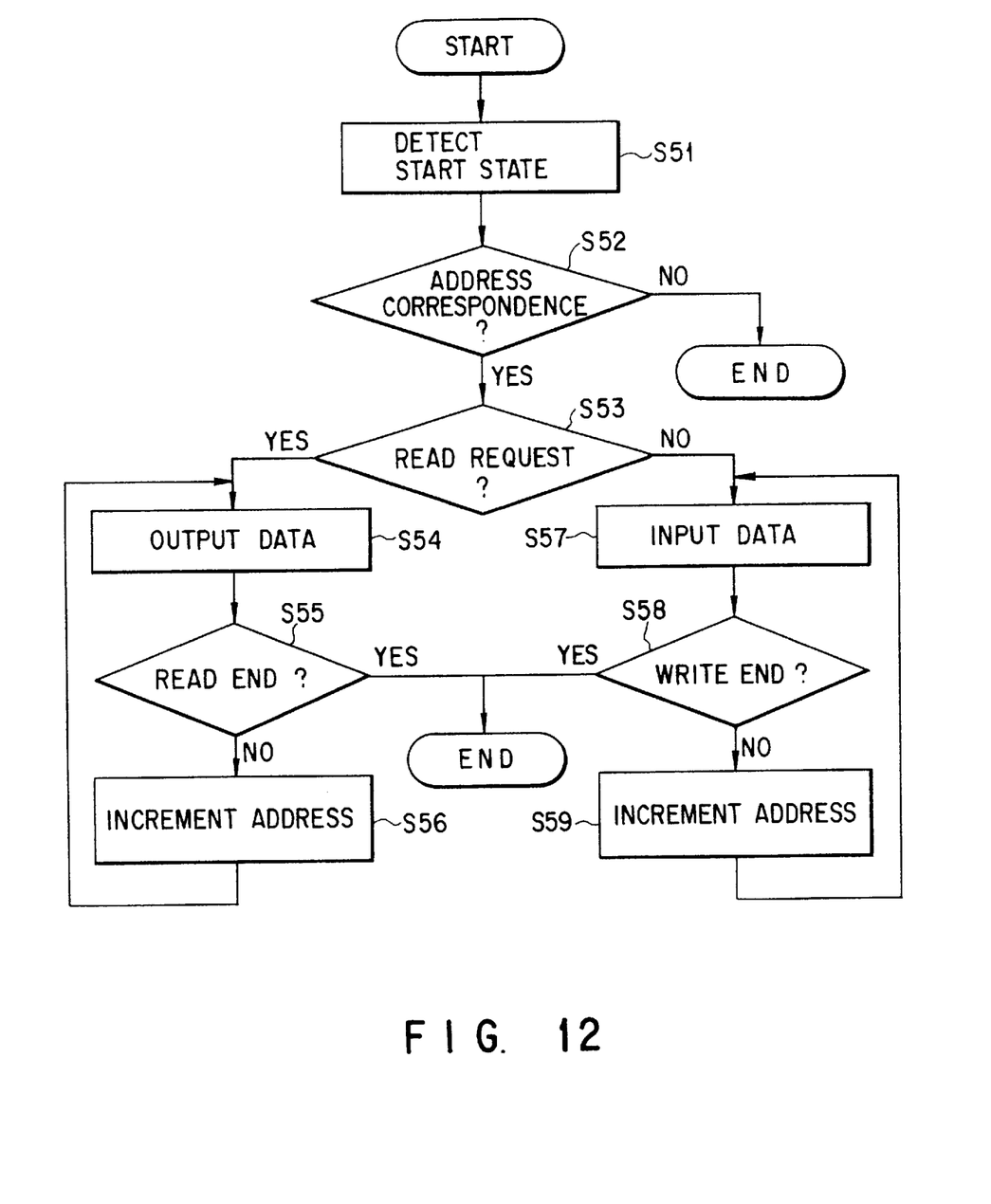
FIG. 12 is a flow chart for explaining the processing when the I/O control gate array operates as a slave.

An operation when the I/O control gate array 17 is a slave will be described below with reference to FIG. 12. When the I/O control gate array 17 is a slave, either the power supply controller 18 or the DS controller 42 is a master.

First, the I/O control gate array 17 detects that the start cycle is executed by a master which has acquired the right to use the I$^2$C BUS 4 (step S51). The I/O control gate array 17 checks whether an address delivered to the I$^2$C BUS 4 after the start cycle corresponds to the address assigned to the I/O control gate array 17 and also checks whether there is a data read request (steps S52 and S53). The output data to the I$^2$C BUS 4 contains 7 bits of an address and one bit indicating read or write access of data. If the address on the I$^2$C BUS 4 does not correspond to one of the addresses of the register set 301 of the I/O control gate array 17, the I/O control gate array 17 determines that no slave is designated and does not perform any special processing.

If the address on the I$^2$C BUS 4 corresponds to one of the addresses of the register set 301 of the I/O control gate array 17 and there is a read request (YES in step S53), the I/O control gate array 17 outputs data stored in the designated address to the I$^2$C BUS 4 through the I$^2$C BUS I/F 303 in synchronism with output clocks from the master (step S54). If the master sends back an ACK after 8-bit data is output, this means that the succeeding data is requested. Therefore, the I/O control gate array 17 transmits data in the next register in the register set 301 (steps S55, S56, and S54). If an ACK is not sent back, if all data after the designated register in the register set 301 is transmitted, or if the master executes the stop cycle or the restart cycle, the I/O control gate array 17 completes the slave transmission processing (YES in step S55).

If the address on the I$^2$C BUS 4 corresponds to one of the addresses of the register set 301 of the I/O control gate array 17 and there is no read request (NO in step S53), the I/O control gate array 17 receives serial data transmitted from the master and writes the data in the corresponding register (step S57). When one data is normally written, the I/O control gate array 17 outputs a 1-bit ACK. If the master consecutively transmits data, the I/O control gate array 17 writes the data in the next register in the register set 301 (steps S58, S59, and S57). If the data is written in all registers after the designated register in the register set 301, or if the master executes the stop cycle or the restart cycle, the I/O control gate array 17 completes the slave receive processing (YES in step S58).

Following the flow explained above, the I/O control gate array 17 can also operate as a slave.

Communications between the I/O control gate array 17, the power supply controller 18, the EEPROM 191 of the battery pack 19, the DS controller 42, and the EEPROM 43 executed by using the I$^2$C BUS 4 in accordance with the depression of the power switch or the eject switch of the docking station 200 will be described below.

Assume that the computer main body 100 is docked with the docking station 200 and the power switch of the docking station 200 is turned on by a user from the state in which the power supplies of both the computer main body 100 and the docking station 200 are OFF.

The ON of the power switch is detected by the DS controller 42. The DS controller 42 first checks whether the power supply of the computer main body 100 is ON by checking the state of a power supply Vcc of the docking bus of the docking port connector 500. If the power supply of the computer main body 100 is OFF, the DS controller 42 informs, by using the I$^2$C BUS 4, the power supply controller 18 that the docking station 200 is connected. The power supply controller 18 powers on the power supply of the computer main body 100 and informs the system BIOS of the docking. The system BIOS reads out PnP information from the EEPROM 43 and resets the system operation environment in accordance with extended cards of the docking station 200.

If the power supply of the computer main body 100 is ON when the power switch of the docking station 200 is turned on, the DS controller 42 informs, by using the I$^2$C BUS 4, the I/O control gate array 17 that the docking station 200 is connected. The I/O control gate array 17 sends an interrupt signal to the CPU 11 and thereby informs the system BIOS that the docking station 200 is connected. The system BIOS reads out PnP information from the EEPROM 43 and resets the system operation environment in accordance with extended cards of the docking station 200.

The following communications are performed when the computer main body 100 is docked with the docking station 200 and the eject button for removing the docking station 200 from the computer main body 100 is depressed by a user from the state in which the power supplies of both the computer main body 100 and the docking station 200 are ON.

When detecting the depression of the eject button, the DS controller 42 informs, through the I$^2$C BUS 4, the I/O control gate array 17 that the eject button is depressed. The I/O control gate array 17 sends an interrupt signal to the CPU 11 and thereby informs the system BIOS of the depression of the eject button. The system BIOS inquires of the OS whether the docking station 200 can be ejected. If the docking station 200 can be ejected, the operating system informs the system BIOS that the ejection is permitted. If, for example, communication with an option card is being executed and cannot be interrupted, the operating system denies the eject request and aborts the eject request command.

When the ejection is permitted by the operating system, the system BIOS executes suspend processing and grants the DS controller 42 permission to eject. Accordingly, the loading mechanism of the docking station 200 is operated to separate the computer main body 100 from the docking station 200.

In the portable computer of this embodiment as described above, the I/O control gate array 17, the power supply controller 18, the EEPROM 191 of the battery pack 19, the DS controller 42, and the EEPROM 43 are connected to the I$^2$C BUS 4. The I$^2$C BUS 4 is connected to the ISA bus 3 by the I/O control gate array 17. The I/O control gate array 17 incorporates the master control logic 171. Master arbitration between the power supply controller 18 and the DS controller 42 connected to the I$^2$C BUS 4 is intensively controlled by using the REQ# lines and the GNT# lines of these masters. Therefore, master arbitration between the devices can be accurately performed without providing each device with a bus monitoring function.

Master arbitration is performed for the I/O control gate array 17 in the same fashion as for other devices by using bit 3 of the register 174a, instead of the REQ# line. Consequently, an appropriate bus arbitration is possible regardless of which device is to operate as a master.

Even if the docking station 200 is removed from the computer main body 100 while the DS controller 42 is operating as a current master, the I$^2$C BUS 4 can be released because DPREQ# becomes inactive. Accordingly, it is possible to prevent the inconvenient situation in which the internal devices such as the power supply controller 18 of the computer main body 100 cannot operate as a master permanently.

In the present invention as has been described above, communications between devices required to operate as a bus master can be efficiently performed through a bi-directional bus, such as an I²C BUS, with a simple structure consisting of one clock signal line and one serial data line, without providing each device with a bus monitoring function.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:
   a system bus;
   a bi-directional bus including only one clock line and only one data line;
   at least one device connected to said bi-directional bus to store predetermined information;
   at least one controller connected to said bi-directional bus to generate a use request for requesting permission to use said bi-directional bus when communication processing occurs, said at least one controller and said at least one device store data transmitted through said bi-directional bus in accordance with a write request;
   a CPU connected to said system bus for determining one of said at least one controller and said at least one device as a communication partner; and
   a bus controller provided between said bi-directional bus and said system bus to receive said generated use request and having a register for storing information indicating said use request in accordance with a request from said CPU, said bus controller granting permission for using said bi-directional bus to either said at least one controller or said bus controller itself in accordance with a predetermined priority order and performing communication processing, under control of said CPU, in accordance with said permission to use said bi-directional bus, said bus controller including:
   a master register having a predetermined number of bits;
   means for writing an address of said communication partner designated by said CPU and a data write request into said master register in accordance with said permission to use said bi-directional bus ;
   means for writing said predetermined number of bits of transmitted data into said master register;
   means for serially outputting said transmitted data written in said master register to said bi-directional bus when said predetermined number of bits are written into said master register; and
   means for repeatedly writing said transmitted data until all of said transmitted data is written into said master register.

2. A computer system according to claim 1, wherein said bus controller further includes a control register, sets access request information indicating a controller which has generated the received use request in said control register, and transmits a use permission by referring to said access request information.

3. A computer system according to claim 1, wherein said bus controller further includes a plurality of registers for storing data generated by communication processing performed by said at least one controller,and
   said CPU reads out said data stored in said registers through said system bus.

4. A computer system according to claim 1, further comprising:
   a second bi-directional bus connected to said bus controller and different from said bi-directional bus; and
   at least one device connected to said second bi-directional bus to store second predetermined information,
   wherein said bus controller executes slave processing in accordance with said at least one controller which executes said communication processing, and performs master processing with one of said at least one device.

5. A computer system according to claim 1, wherein said at least one controller includes a power supply controller for controlling a power supply used to power a portable computer.

6. A computer system according to claim 1, wherein:
   said at least one controller includes a plurality of controllers connected to said bi-directional bus,
   said bus controller detects an abnormality of said communication processing in accordance with said use request and, in accordance with detecting said abnormality, transmits said use permission to one controller of said plurality of controllers, said one controller being different from another controller of said plurality of controllers which is executing said communication processing having said abnormality.

7. A computer system according to claim 1, wherein said data write request is information indicating a data transfer direction.

8. A computer system comprising:
   a system bus;
   a bi-directional bus including only one clock line and only one data line;
   at least one device connected to said bi-directional bus to store predetermined information;
   at least one controller connected to said bi-directional bus to generate a use request for requesting permission to use said bi-directional bus when communication processing occurs, said at least one controller and said at least one device output data to said bi-directional bus in accordance with a read request;
   a CPU connected to said system bus for determining one of said at least one controller and said at least one device as a communication partner; and
   a bus controller provided between said bi-directional bus and said system bus to receive said generated use request and having a register for storing information indicating said use request in accordance with a request from said CPU, said bus controller granting permission to use said bi-directional bus to either said at least one controller or said bus controller itself in accordance with a predetermined priority order and performing communication processing, under control of said CPU, in accordance with said permission to use said bi-directional bus, said bus controller including:
   a master register having a predetermined number of bits;
   means for writing an address of said communication partner designated by said CPU and a data write request into said master register in accordance with said permission to use said bi-directional bus;

means for writing said predetermined number of bits of transmitted data into said master register;

means for serially outputting said transmitted data written into said master register to said bi-directional bus when said writing means writes said predetermined number of bits into said master register; and means for sequentially writing received data transmitted through said bi-directional bus into said master register; and means for outputting said received data written into said master register to said system bus when said predetermined number of bits of said received data are written.

9. A computer system according to claim 8, wherein said data write request is information indicating a data transfer direction.

10. A computer system comprising:

a CPU for controlling said computer system:

a system bus to which said CPU is connected :

a bi-directional bus including only one clock line and only one data line:

a bus controller provided between said bi-directional bus and said system bus to receive a generated use request, comprising:

a register for storing information indicating said use request for requesting permission to use said bi-directional bus in accordance with a request from said CPU, a master register having a predetermined number of bits, means for writing an address of a communication target designated by said CPU and information indicating a data transfer direction into said master register, means for writing said predetermined number of bits of transmitted data into said master register, means for serially outputting said transmitted data written in said master register to said bi-directional bus when said information indicating said data transfer direction indicates a data write request, means for sequentially writing received data transmitted through said bi-directional bus into said master register and for outputting said received data written in said master register to said system bus when said information indicating said data transfer direction indicates a data read request;

an extended unit in which a portable computer can be loaded;

an extended unit controller provided in said extended unit and connected to said bi-directional bus to generate said use request for requesting permission to use said bi-directional bus when communication processing occurs and to execute said communication processing in accordance with said permission to use; and a control line pair including a request signal line and a grant signal line, said control line pair connecting said extended unit controller and said bus controller, wherein said bus controller is for arbitrating, when said use request is generated, said permission to use said bi-directional bus in accordance with a predetermined priority order, and detecting an abnormality of the communication processing and arbitrating use of said bi-directional bus, said extended unit controller sends said use request to said request signal line, and said bus controller sends said permission to use said bi-directional bus to said grant signal line and detects said abnormality of said communication processing in accordance with said request signal line.

11. A computer system comprising:

a CPU for controlling said computer system;

a system bus to which said CPU is connected;

a bi-directional bus including only one clock line and only one data line;

a bus controller provided between said bi-directional bus and said system bus to receive a generated use request, comprising:

a register for storing information indicating said use request for requesting permission to use said bi-directional bus in accordance with a request from said CPU, a master register having a predetermined number of bits, means for writing an address of a communication target designated by said CPU and information indicating a data transfer direction into said master register, means for writing said predetermined number of bits of transmitted data into said master register, means for serially outputting said transmitted data written in said master register to said bi-directional bus when said information indicating said data transfer direction indicates a data write request, means for sequentially writing received data transmitted through said bi-directional bus into said master register and for outputting said received data written in said master register to said system bus when said information indicating said data transfer direction indicates a data read request;

at least one controller connected to said bi-directional bus to generate said use request requesting permission to use said bi-directional bus when communication processing occurs and to execute communication processing in accordance with said permission to use;

a second bi-directional bus including only one clock line and only one data line;

at least one device connected to said second bi-directional bus to store predetermined information;

a control line pair including a request signal line and a grant signal line, said control line pair being provided for each of said at least one controller and connecting each of said at least one controller to said bus controller, wherein said at least one controller sends said use request to said request signal line, said bus controller receives said generated use request, transmits said permission to use said bi-directional bus to a controller of said at least one controller to be granted access to said bi-directional bus in accordance with a predetermined priority order, executes slave processing in accordance with said controller which executes said communication processing, performs master processing with one of said at least one device through said second bi-directional bus, and sends said permission to use said bi-directional bus to said grant signal line.

12. A computer system comprising:

a CPU for controlling said computer system;

a system bus to which said CPU is connected;

a bi-directional bus including only one clock line and only one data line;

a bus controller provided between said bi-directional bus and said system bus to receive a generated use request, comprising:

a register for storing information indicating said use request for requesting permission to use said bi-directional bus in accordance with a request from said CPU, a master register having a predetermined number of bits, means for writing an address of a communication target designated by said CPU and information indicating a data transfer direction into said master register, means for writing said predetermined number of bits of transmitted data into said master register, means for serially outputting said transmitted data written in said master register to said bi-directional bus when said information indicating said data transfer direction indicates a data write request, means for sequentially writing received data transmitted through said bi-directional bus into said master register and for outputting said received data written in said master register to said system bus when said information indicating said data transfer direction indicates a data read request;

an extended unit in which a portable computer can be loaded; and an extended unit controller provided in said extended unit and connected to said bi-directional bus to generate said use request for requesting permission to use said bi-directional bus when communication processing occurs and to execute said communication processing in accordance with said permission to use, wherein:

said bus controller is for arbitrating, when said use request is generated, said permission to use said bi-directional bus in accordance with a predetermined priority order, and detecting an abnormality of the communication processing and arbitrating use of said bi-directional bus, said extended unit controller sends said use request to a request signal line connecting said extended unit controller and said bus controller, and said bus controller sends said permission to use said bi-directional bus to a grant signal line connecting said bus controller and said extended unit controller and detects said abnormality of said communication processing in accordance with said request signal line.

13. A computer system comprising:

a CPU for controlling said computer system;

a system bus to which said CPU is connected;

a bi-directional bus including only one clock line and only one data line;

a bus controller provided between said bi-directional bus and said system bus to receive a generated use request, comprising:

a register for storing information indicating said use request for requesting permission to use said bi-directional bus in accordance with a request from said CPU, a master register having a predetermined number of bits, means for writing an address of a communication target designated by said CPU and information indicating a data transfer direction into said master register, means for writing said predetermined number of bits of transmitted data into said master register, means for serially outputting said transmitted data written in said master register to said bi-directional bus when said information indicating said data transfer direction indicates a data write request, means for sequentially writing received data transmitted through said bi-directional bus into said master register and for outputting said received data written in said master register to said system bus when said information indicating said data transfer direction indicates a data read request;

at least one controller connected to said bi-directional bus to generate said use request requesting permission to use said bi-directional bus when communication processing occurs and to execute communication processing in accordance with said permission to use; and a second bi-directional bus including only one clock line and only one data line;

at least one device connected to said second bi-directional bus to store predetermined information, wherein:

said at least one controller sends said use request to a request signal line connecting said at least one controller and said bus controller, said bus controller receives said generated use request, transmits said permission to use said bi-directional bus to a controller of said at least one controller to be granted access to said bi-directional bus in accordance with a predetermined priority order, executes slave processing in accordance with said controller which executes said communication processing, performs master processing with one of said at least one device through said second bi-directional bus, and sends said permission to use said bi-directional bus to a grant signal line connecting said bus controller and said controller to be granted access.

\* \* \* \* \*